(12) United States Patent
Angele et al.

(10) Patent No.: US 7,487,166 B2
(45) Date of Patent: Feb. 3, 2009

(54) MAPPING WEB SERVICES TO ONTOLOGIES

(75) Inventors: Jurgen Angele, Kandel (DE); Jurgen Harbarth, Darmstadt (DE); Harald Schoning, Dieburg (DE); Walter Waterfeld, Darmstadt (DE); Kay Winkler, Darmstadt (DE); Michael Gesmann, Darmstadt (DE)

(73) Assignees: ontoprise GmbH, Karlsruhe (DE); Software AG, Darmstadt (DE)

( * ) Notice: Subject to any disclaimer, the term of this patent is extended or adjusted under 35 U.S.C. 154(b) by 525 days.

(21) Appl. No.: 11/108,139

(22) Filed: Apr. 18, 2005

(65) Prior Publication Data

US 2006/0173868 A1    Aug. 3, 2006

(30) Foreign Application Priority Data

Jan. 31, 2005    (EP)    ................................. 05001913

(51) Int. Cl.
*G06F 7/00*    (2006.01)
(52) U.S. Cl. ............................... 707/100; 707/3; 707/6; 707/102; 707/104.1
(58) Field of Classification Search ...................... 707/3, 707/100, 104.1
See application file for complete search history.

(56) References Cited

U.S. PATENT DOCUMENTS

| | | | |
|---|---|---|---|
| 6,418,448 B1 * | 7/2002 | Sarkar ...................... 707/104.1 |
| 7,093,200 B2 * | 8/2006 | Schreiber et al. ............ 715/835 |
| 2003/0101170 A1 * | 5/2003 | Edelstein et al. ............... 707/3 |
| 2004/0093331 A1 * | 5/2004 | Garner et al. .................. 707/3 |
| 2004/0093344 A1 * | 5/2004 | Berger et al. ................ 707/102 |
| 2004/0139095 A1 | 7/2004 | Trastour et al. |
| 2005/0234889 A1 * | 10/2005 | Fox et al. ........................ 707/3 |
| 2006/0074980 A1 * | 4/2006 | Sarkar ...................... 707/104.1 |
| 2006/0161544 A1 * | 7/2006 | Lee et al. ........................ 707/6 |
| 2006/0206883 A1 * | 9/2006 | Sabbouh ...................... 717/146 |

OTHER PUBLICATIONS

Matthias Ferdinand et al., "Lifting XML Schema to OWL", ICWE Proceedings 2004, pp. 1-5.
K. Ari Krupnikov et al., "Data Binding Using W3C XML Schema Annotations", Mar. 6, 2004; pp. 1-9.
Jun Shen et al., "Mapping Web Services Specifications to Process Ontology: Opportunities and Limitations", Distributed Computing Systems, 2004 Proceedings; May 26, 2004; pp. 229-235.
David Trastour et al., "Using Semantic Web Technology to Enhance Current Business-to-Business Integration Approaches", Enterprise Distributed Object Computing Conference, 2003 Proceedings; Sep. 16, 2003; pp. 222-231.

* cited by examiner

*Primary Examiner*—Wilson Lee
*Assistant Examiner*—Binh V Ho
(74) *Attorney, Agent, or Firm*—Buchanan Ingersoll & Rooney PC

(57) ABSTRACT

A system for enterprise information integration is described. The system is based on different layers:
- the data sources,
- source ontologies corresponding to the data schema of the data sources,
- an integration ontology integrating the different source ontologies,
- a level of query input, preferably in the form of a web service.

Between the levels, mapping rules are used. For the mapping of document style web services and XML documents to ontologies detailed rules are given, covering i.a. simpleContent and complexContent elements, which are mapped to class properties and relations (object properties), respectively.

15 Claims, 3 Drawing Sheets

MAPPING WEB SERVICES TO ONTOLOGIES

FIELD OF THE INVENTION

The present invention relates to unified querying of distributed data sources and methods for the efficient recovery of information stored in distributed data sources.

More particularly, the present invention concerns the mapping of the data structure of XML documents to ontologies.

BACKGROUND OF THE INVENTION

Enterprise data systems, especially for large enterprises, typically include multiple data sources that may be based on different data schemas like

- relational databases,
- XML documents, XML schema, XML document type definitions (DTD),
- web services,
- Adabas files
- SGML texts,
- Interface Description Language (IDL),
- JAVA interface,
- Resource Description Framework (RDF),
- Unified Modeling Language (UML),
- Ontology Web Language (OWL),
- Object role modelling,
- Topic maps,
- etc.

As a result of several IT generations and/or mergers and acquisitions, several databases with different schemas may contain information on different areas of the business. On the other hand, information may be gained form web services. For example, enterprise employment data may be stored in a relational database conforming to a first relational database schema and enterprise accounting data may be stored in a relational databases conforming to a second relational database schema. Often these various data sources may overlap, and it is difficult for a user to query across the enterprise data sources.

There is, thus, a need for tools for data integration or information integration and a need for a unified querying tool that enables a user to query data across data sources conforming to different data schemas. The need for a unified querying tool also arises when a single question crosses multiple data sources.

DESCRIPTION OF RELATED ART

The patent applications US 2004/0216030 A1, US 2004/0093559 A1, US 2004/0093344 A1, US 2003/0179228 A1, US 2003/0177481 A1, US 2003/0163597 A1, US 2003/0163450 A1, US 2003/0120665 A1, and US 2003/0101170 A1, all belonging to one family, describe the mapping of data schema, including inter alia relational database schema and XML schema, into a central ontology model for solving the data integration problem. (Ontologies will be described in more detail below.) Basic constructs of the different data schema are mapped to classes and properties of the central ontology model. Thus, for a relational database schema, tables are generally mapped to ontology classes, and fields of tables are generally mapped to properties of the classes. Similarly, for XML schema, complex types are generally mapped to ontology classes, and elements and properties within complex types are generally mapped to ontology properties.

Thus, a mapping is needed between XML documents and constructs of ontologies.

XML data can originate from
a web service,
an XML document or database
or another source of XML data.

Web services take—in the most general case—an XML document as input and generate an XML document as output or answer. Such web services are called "document style web services".

Short Introduction to XML

XML is an abbreviation for eXtensible Markup Language. A markup language is (simply described) a collection of tags and text-values. The most well-known markup language today is HTML, which is used to layout homepages. XML enables people to design their own markup languages, tailored for storing any kind of information. The following is an example XML-document:

```
<addresses>
    <employee name="John Doe">
        <address>
            <street> Oakroad 5 </street>
            <city> Lyngby </city>
            <country> Denmark </country>
        </address>
        <phone> 124-21424-21 </phone>
        <email> jd@example.com </email>
        <category>friend</category>
        <category>co-worker</category>
    </employee>
</addresses>
```

Looking at this document quickly reveals its purpose: it's a markup-language for storing addresses. Let's take a detailed view of one of the elements or nodes:

<employee name="John Doe"> . . . </person>

<employee> is called the opening tag. name="John Doe" inside the opening tag is called an attribute. The name of the attribute is "name", and the value or instance is "John Doe". " . . . " is the content of the element. This can be either more elements or text-data. </employee> is the closing tag.

An element must always be closed to make a well-formed XML-document. Comments in a XML-document have the same syntax as in a HTML-document:

<!--Comment goes here.-->

It's important to notice the structure of an XML-document. The outermost element, the one containing all the other tags, is called the root-node or root-element. In the above example <addresses> is the root-node. Any elements in the contents of another element are called the children of the element.

An XML-document can be visualized by a hierarchical tree structure. Each element is a node. The top node is the root-element or root-node. Notice that all nodes, except the root, have one and only one parent.

All XML-documents should start with the line

<?xml version="1.0" encoding="iso-8859-1"?>

Variations can be made to the encoding-attribute. Adding the following processing instructions:

<?xml-stylesheet href="stylesheet.xsl" type="text/xsl"?> will tell whatever program that wants to render the XML-file, which XSL-stylesheet to use. Making XML-documents that contain this line will make it possible for Internet Explorer (versions 6 and above) to render the document according to the stylesheet.

Short Introduction to XML Schema

An XML schema describes the structure of an XML document. The XML schema language is also referred to as XML Schema Definition (XSD). Look at the following simple XML document called "note.xml":

```
<?xml version="1.0"?>
<note>
    <to>Tove</to>
    <from>Jani</from>
    <heading>Reminder</heading>
    <body>Don't forget me this weekend!</body>
</note>
```

This is a simple XML schema file called "note.xsd" that defines the elements of the XML document above ("note.xml"):

```
<?xml version="1.0"?>
<xs:schema xmlns:xs="http://www.w3.org/2001/XMLSchema"
targetNamespace="http://www.w3schools.com"
xmlns="http://www.w3schools.com"
elementFormDefault="qualified">
    <xs:element name="note">
        <xs:complexType>
            <xs:sequence>
                <xs:element name="to" type="xs:string"/>
                <xs:element name="from" type="xs:string"/>
                <xs:element name="heading" type="xs:string"/>
                <xs:element name="body" type="xs:string"/>
            </xs:sequence>
        </xs:complexType>
    </xs:element>
</xs:schema>
```

The note element is said to be of a complex type (complex element) because it contains other elements. The other elements (to, from, heading, body) are said to be simple types (simple element) because they do not contain other elements.

type="xs:string" defines the datatype, here a string. Other datatypes are possible, like "integer", "date", etc. These simplest types are called "atomic" types.

The <schema> element is the root element of every XML schema:

```
<?xml version="1.0"?>
<xs:schema>...
...
</xs:schema>
```

The <schema> element may contain some attributes. A schema declaration often looks something like this:

```
<?xml version="1.0"?>
<xs:schema xmlns:xs="http://www.w3.org/2001/XMLSchema"
targetNamespace="http://www.w3schools.com"
xmlns="http://www.w3schools.com"
elementFormDefault="qualified">
...
</xs:schema>
```

The following fragment:

```
xmlns:xs="http://www.w3.org/2001/XMLSchema"
``` indicates that the elements and data types used in the schema (schema, element, complexType, sequence, string, boolean, etc.) come from the "http://www.w3.org/2001/XMLSchema" namespace. It also specifies that the elements and data types that come from the "http://www.w3.org/2001/XMLSchema" namespace should be prefixed with "xs:".

This fragment:

```
targetNamespace="http://www.w3schools.com"
``` indicates that the elements defined by this schema (note, to, from, heading, body.) come from the "http://www.w3schools.com" namespace.

This fragment:

```
xmlns="http://www.w3schools.com"
``` specifies the default namespace declaration. This declaration tells the schema-validator that all the elements used in this XML document are declared in the "http://www.w3schools.com" namespace.

This fragment:

```
elementFormDefault="qualified"
``` indicates that any elements used by the XML instance document, which were declared in this schema, must be namespace qualified.

This XML document has a reference to an XML schema:

```
<?xml version="1.0"?>
<note xmlns="http://www.w3schools.com"
xmlns:xsi="http://www.w3.org/2001/XMLSchema-instance"
xsi:schemaLocation="http://www.w3schools.com note.xsd">
    <to>Tove</to>
    <from>Jani</from>
    <heading>Reminder</heading>
    <body>Don't forget me this weekend!</body>
</note>
```

Once you have the XML Schema Instance namespace available:

```
xmlns:xsi="http://www.w3.org/2001/XMLSchema-
    instance"
``` you can use the schemaLocation attribute. This attribute has two values. The first value is the namespace to use. The second value is the location of the XML schema to use for that namespace:

```
xsi:schemaLocation="http://www.w3schools.com
    note.xsd"
```

For an XML documents an XML schema can be generated, which contains the data type definitions of the data contained in the XML document. Using such an XML schema, the corresponding XML document can be validated, i.e. the data in the document can be checked under the aspect, whether they conform to the correct data type. The validation process generates an annotated version of the XML document, containing for every data or XML instance a PSVI instance (PSVI=post schema validation info set), a so called tag, which is a reference to the suitable data type from the XML schema. The PSVI instance contains information on the data type of the XML instance. An example of a PSVI is:

```
<ProductDetails xsi:type="productDetailsType">
```

It follows the above given example <addresses> in PSVI annotated version:

```
<addresses xsi:type="addressestype">
    <employee xsi:type="fullpersoninfo" name="John Doe">
        <shoesize xsi:type="shoesizetype"
            country="france">35</shoesize>
        <address xsi:type="addresstype">
            <street xsi:type="xs:string"> Oakroad 5
            </street>
            <city xsi:type="xs:string"> Lyngby </city>
            <country xsi:type="xs:string"> Denmark
            </country>
        </address>
        <phone xsi:type="xs:string"> 124-21424-21 </phone>
        <email xsi:type="xs:string"> jd@example.com
        </email>
        <category xsi:type="xs:string">friend</category>
        <category xsi:type="xs:string>co-worker</category>
    </employee>
</addresses>
``` xsi:type="fullpersoninfo" is a PSVI annotation. It comes in the form of an additional attribute.

With XML hierarchical structures with multiple occurrences of nodes the required mapping gets difficult.

SUMMARY OF THE INVENTION

It is, therefore, an object of the present invention to provide an exhaustive method for mapping XML data structures to ontology constructs.

This aim is achieved by the invention as claimed in the independent claim. Advantageous embodiments are described in the dependent claims.

Although no multiple referenced claims are drawn, all reasonable combinations of the features in the claims shall be disclosed.

Generally, for XML schema, complex types are mapped to ontology classes, and elements and attributes within complex types are mapped to ontology properties.

For the mapping of XML documents and document style web services, the following method is proposed. In what follows, individual steps of the method will be described in more detail. The steps do not necessarily have to be performed in the order given in the text. Also, further steps not explicitly stated may be part of the method.

Before describing the method, some more elements of XML schema have to be defined.

simpleType Element

An XSD simpleType element is an element whose type is of simple type (e.g. type="xs:string"):

```
<xs:element name="firstname" type="xs:string"/>
``` simpleContent Element with Attributes

The simpleContent element contains extensions or restrictions on a text-only complex type or on a simple type as content and contains no elements, however it has attributes. The corresponding parent element is a complexType element (see below). Here is an example of an XML element (<shoesize>) that contains no elements:

```
<shoesize country="france">35</shoesize>
```

The following example declares a complexType, "shoesize", with its content defined as an integer data type and with a country attribute:

```
<xs:complexType name="shoesizetype">
    <xs:simpleContent>
        <xs:extension base="xs:integer">
            <xs:attribute name="country" type="xs:string" />
        </xs:extension>
    </xs:simpleContent>
</xs:complexType>
<xs:element name="shoesize" type="shoesizetype"/>
``` complexContent Element

The complexContent element defines extensions or restrictions on a complex type that contains mixed content or elements only.

The following example has a complex type, "fullpersoninfo", that derives from another complex type, "personinfo", by extending the inherited type with three additional elements (address, city and country):

```
<xs:complexType name="personinfo">
    <xs:sequence>
        <xs:element name="firstname" type="xs:string"/>
        <xs:element name="lastname" type="xs:string"/>
        <xs:element name="shoesize" type="shoesizetype"/>
    </xs:sequence>
</xs:complexType>
<xs:complexType name ="companytype">
    <xs:sequence>
        <xs:element name="name" type="xs:string"/>
        <xs:element name="employee" type="fullpersoninfo"/>
    </xs:sequence>
</xs:complexType>
<xs:complexType name="fullpersoninfo">
    <xs:complexContent>
        <xs:extension base="personinfo">
            <xs:sequence>
                <xs:element name="address" type="xs:string"/>
                <xs:element name="city" type="xs:string"/>
                <xs:element name="country" type="xs:string"/>
            </xs:sequence>
        </xs:extension>
    </xs:complexContent>
</xs:complexType>
```

In the example above, the "employee" element must contain, in sequence, the following elements: "firstname", "lastname", "address", "city", and "country".

In short, an XSD complexContent element is an element whose type is comlexType with complexContent.

The Proposed Method

The proposed method for mapping an XML data structure to an ontology comprises the following steps:

Providing an XML document with a corresponding XML schema definition.

Mapping XML schema declarations and definitions to ontology schema definitions in the following way:

mapping XML element and attribute declarations to ontology property definitions;

mapping XML schema complexType definitions to ontology class definitions.

If information (PSVI annotation) from the validation of the XML document by the XML schema is used, mapping XML nodes with a known PSVI-type in the following way to ontology instances:

mapping PSVI complexType annotations to ontology class instances;

mapping element and attribute nodes to ontology property instances.

Defining a predefined ontology class definition and a predefined ontology datatype property definition and a predefined object property definition.

If the XML document has been validated by the XML schema, mapping XML nodes without PSVI-type annotation to ontology instances and ontology definitions by mapping XML element and attribute nodes to ontology property instances and ontology class instances.

The method according to the invention will be described in more details in the following paragraphs.

Mapping XML schema declarations and definitions to ontology schema definitions in the way detailed below, i.e. mapping entirely on the schema level. Declarations are the names of elements which can be found in the XML schema as well as in the XML document. Definitions only appear in the XML schema except for explicitly assigned types in an XML document via the xsi:type mechanism.

Mapping an XSD complexType definition to a class definition of the ontology. The name of the class is the name of complexType (or the system defines one).

Mapping an XSD complexContent element declaration of an XSD complexType definition to an object property definition of the ontology, the object property having a domain class and a range class, the domain class being the class where the element is used, and the range class of the object property being the class to which the complexType of the complexContent element is mapped. An example of an XSD complexContent element declaration in the above given examples is "employee".

In general, the domain class of a property is the class whose property is defined by the property. The range defines the allowed values of the property. E.g. the above given class "companytype" has the datatype property "name" and the object property "employee", which has as range (class) "fullpersoninfo" and as domain (class) "companytype".

Mapping an XSD simpleType element declaration to a datatype property definition of the ontology, the datatype property having a domain class, the domain class being the class where the element is used, and the range type being the XML schema type of the simpleType element declaration. An example of an XSD simpleContent element declaration in the above given examples is "firstname".

More precisely defined, an XSD simpleContent element is an element whose type is comlexType with simpleContent. The term XSD simpleContent element is also used for a simpleType element (type="xs:string"), i.e. for an element whose element content is simpleType.

Mapping an XSD simpleContent element declaration with an attribute to an object property definition of the ontology, the object property having a domain class and a range class, the domain class being the class where the element is used, and the range class of the object property being the class to which the complexType of the simpleContent element is mapped. An example of an XSD simpleContent element declaration with an attribute in the above given examples is "shoesize".

Mapping an XSD attribute declaration to a datatype property definition of the ontology, the datatype property having a domain class, the domain class being the class where the element is used, and the range type being the XML schema type of the attribute declaration. An example of an XSD attribute declaration in the above given examples is "country".

If information (PSVI annotation) from the validation of the XML document by the XML schema is used, mapping XML nodes with a known PSVI-type in the following way to ontology instances.

A PSVI annotation (e.g. xsi:type="fullpersoninfo") leads the way to the ontology schema construct as defined above, which is then complemented with the instance from the XML element. For an ontology, the "data" are called instances. The instance of a class is called "object". The "instances" of XML documents are called "nodes".

"Object properties" of a class are sometimes called "relations". They define pointers from one class or object to another class or object. Usually, object properties among classes and the inheritance of properties are incorporated into an ontology. Besides object properties, so called datatype properties are the norm, for which the properties of a class can be defined in the form of data.

For each XML element node with a complexType annotation an instance of a class of the ontology is generated, the class of this instance is the class to which this complexType definition is mapped. An example of an element node with a complexType annotation in the above given examples is "employee".

Mapping an XML simpleType element node to a datatype property instance of the ontology, the domain class instance of the datatype property instance being the instance which is generated for the PSVI type annotation where the element node is used. An example of an XML simpleType element node in the above given examples is ""firstname"=Peter".

Mapping an XML simpleContent element node with an attribute to an object property instance of the ontology, having a domain class instance and a range class instance, the domain class instance of the object property instance being the instance which is generated for the type annotation where the element is used, the range class instance of the object property instance being the class instance which is generated for the PSVI type annotation of the XML simpleContent element node. An example of an XML simpleContent element node in the above given examples is <shoesize country="france">35</shoesize>.

Mapping an XML complexContent element node to an object property instance of the ontology, the object property having a domain class instance and a range class instance, the domain class instance of the object property instance being the instance which is generated for the PSVI type annotation where the element is used, and the range class instance of the object property instance being the class instance which is generated for the PSVI type annotation of the XML complexContent element node. An example of an XML complexContent element node in the above given examples is:

```
<employee name="John Doe">
    <shoesize
        country="france">35</shoesize>
    <address>
        <street>Oakroad 5
        </street>
        <city>Lyngby </city>
        <country>Denmark
        </country>
    </address>
    <phone>124-21424-21 </phone>
    <email>jd@example.com
    </email>
    <category>friend</category>
    <category>co-worker</category>
</employee>
```

Mapping an XML simpleType attribute node to a datatype property instance of the ontology, the domain class instance of the datatype property instance being the instance which is generated for the PSVI type annotation where the attribute node is used. An example of an XML simpleType attribute node in the above given examples is country="France".

Defining the following predefined ontology schema definitions:
- a single class definition which is a super class of all generated class definitions;
- a single object property definition which is a super object property of all generated object property definitions, the object property having a domain class and a range class, which are said super class;
- a single datatype property definition which is a super datatype property of all generated datatype property definitions, the datatype property having a domain class which is said super class, the range type being any atomic type.

If the XML document has been validated by the XML schema, mapping XML nodes without PSVI-type annotation to ontology instances and ontology definitions in the following way:

For each XML element node which is not a leaf-node an instance of the predefined super class of all generated classes of the ontology is generated; and an object property instance of the predefined super object property is generated, the domain class instance of the object property instance being the instance which is generated for the containing element node and the range class instance being the class instance which is generated for this XML element node. A leaf-node is a node on the lowest level.

For each XML leaf element node without attribute nodes a datatype property instance of the predefined super datatype property is generated, the domain class instance of the datatype property being the instance which is generated for the containing element node. The "containing element node" is the next higher level node of the XML document. An example of an XML leaf element node without attribute nodes in the above given examples is ""firstname"=Peter".

For each XML attribute node a datatype property instance of the predefined super datatype property is generated, the domain class instance of the datatype property being the instance which is generated for the element node to which the attribute belongs.

Typical XML nodes without PSVI-type are nodes validated via XSD wildcards. As defaults the following predefined ontology schema definitions are preferably used:

| class | GeneralWSInstance |
|---|---|
| object property | GeneralWSObjectProperty |
| datatype property | GeneralWSDatatypeProperty |

Thus, the ontology instances and property instances have always these ontology definitions as types: either directly for XML nodes without PSVI-types or indirectly for nodes with PSVI-types, because all generated ontology definitions have these ontology definitions as super classes or super properties.

Class and property types are preferably generated from the schema definitions. If this is not possible (i.e. if there is no PSVI-type e.g. for wildcard elements), class and property definitions are generated using the default definitions.

Mapping an XML Web Service to an Ontology

Mapping document style web services to an ontology can be achieved, if the mapping of the XML data structure needed therefore is accomplished according to the method described above.

In more detail: for mapping an XML web service to an ontology the following steps are performed:

Providing an XML SOAP webservice with a corresponding web service description (WSDL).

Mapping the WSDL definitions to ontology schema definitions in the following way:
- mapping an operation definition to a class definition of the ontology;
- mapping a part definition to an ontology property definition.

The input and output message of the SOAP request are mapped in the following way to ontology instances:
- a single SOAP request is mapped to a single ontology class instance;
- the element nodes representing the parts of the input and output message are mapped to ontology property instances.

More precisely, the mapping of the WSDL definitions to ontology schema definitions can be done in the following way:
- mapping an operation definition to a class definition of the ontology;
- if the part of the input or output message is defined as an complexContent element declaration, it is mapped to an object property definition of the ontology, the object property having a domain class and a range class, the domain class being the class which is mapped from the operation definition, and the range class of the object property being the class to which the complexType of the complexContent element is mapped;
- if the part of the input or output message is defined as an XSD simpleType element declaration, it is mapped to a datatype property definition of the ontology, the datatype property having a domain class, which is mapped from the operation definition and the range type being the XML schema type of the simpleType element declaration;
- if the part of the input or output message is defined as an XSD simpleContent element declaration with an attribute, it is mapped to an object property definition of the ontology, the object property having a domain class and a range class, the domain class being the class, which is mapped from the operation definition, and the range class of the object property being the class to which the complexType of the simpleContent element is mapped.

An example of an operation is "getProductDetails" in Appendix A. An example of a part definition with an element declaration of simpleType is "ProductNumber" in Appendix A. An example of a part definition with an complexContent element declaration is "ProductDetails" in Appendix A.

Further, the input and output message of the soap request are mapped in the following way to ontology instances:
- for each SOAP request of an operation an instance of a class of the ontology is generated, the class of this instance is the class to which this operation definition is mapped;
- if the input or output message contains XML simpleType element node it is mapped to a datatype property instance of the ontology, the domain class instance of the datatype property instance being the instance which is generated for the operation of the SOAP request;

if the input or output message contains an XML simpleContent element node with an attribute it is mapped to an object property instance of the ontology, the object property having a domain class instance and a range class instance, the domain class instance of the object property instance being the instance which is generated for the operation of the SOAP request, the range class instance of the object property instance being the class instance which is generated for the PSVI type annotation of the XML simpleContent element node;

if the input or output message contains an XML complexContent element node it is mapped to an object property instance of the ontology, the object property having a domain class instance and a range class instance, the domain class instance of the object property instance being the instance which is generated for operation of the SOAP request, and the range class instance of the object property instance being the class instance which is generated for the PSVI type annotation of the XML complexContent element node.

An example of a request operation is the input message of "getProductDetails" in Appendix C. An example of an simple element node part is the node "ProductNumber" in the input message of the SOAP request in Appendix C. An example of a complex content element node part is the node "ProductDetails" in the output message of the SOAP request in Appendix C.

Grounding of Input Messages

In order for a web service to be able to produce a result or an output, the input must be well defined. The input may not contain variables; all variables must have assigned values. In other words, all variables must be "grounded". A property of an ontology is "grounded" if there is an instance or value for this property. Therefore, an ontology definition is needed, in which an object or datatype property of an ontology class can be marked as grounded.

Furthermore, the object of the invention is achieved by:

a computer loadable data structure that is adapted to perform the method according to one of the embodiments described in this description while the data structure is being executed on a computer, a computer program, wherein the computer program is adapted to perform the method according to one of the embodiments described in this description while the program is being executed on a computer, a computer program comprising program means for performing the method according to one of the embodiments described in this description while the computer program is being executed on a computer or on a computer network, a computer program comprising program means according to the preceding claim, wherein the program means are stored on a storage medium readable to a computer, a storage medium, wherein a data structure is stored on the storage medium and wherein the data structure is adapted to perform the method according to one of the embodiments described in this description after having been loaded into a main and/or working storage of a computer or of a computer network, a computer program product having program code means, wherein the program code means can be stored or are stored on a storage medium, for performing the method according to one of the embodiments described in this description, if the program code means are executed on a computer or on a computer network, at least one of an operating system, a computer readable medium having stored thereon a plurality of computer-executable instructions, a co-processing device, a computing device and a modulated data signal carrying computer executable instructions for performing the method according to one of the embodiments described in this description.

Other objects and advantages of the present invention may be ascertained from a reading of the specification and appended claims in conjunction with the drawings therein.

BRIEF DESCRIPTION OF THE DRAWINGS

For a more complete understanding of the present invention, reference is established to the following description made in connection with accompanying drawings in which.

DETAILED DESCRIPTION OF THE PREFERRED EMBODIMENTS

Figure 1:
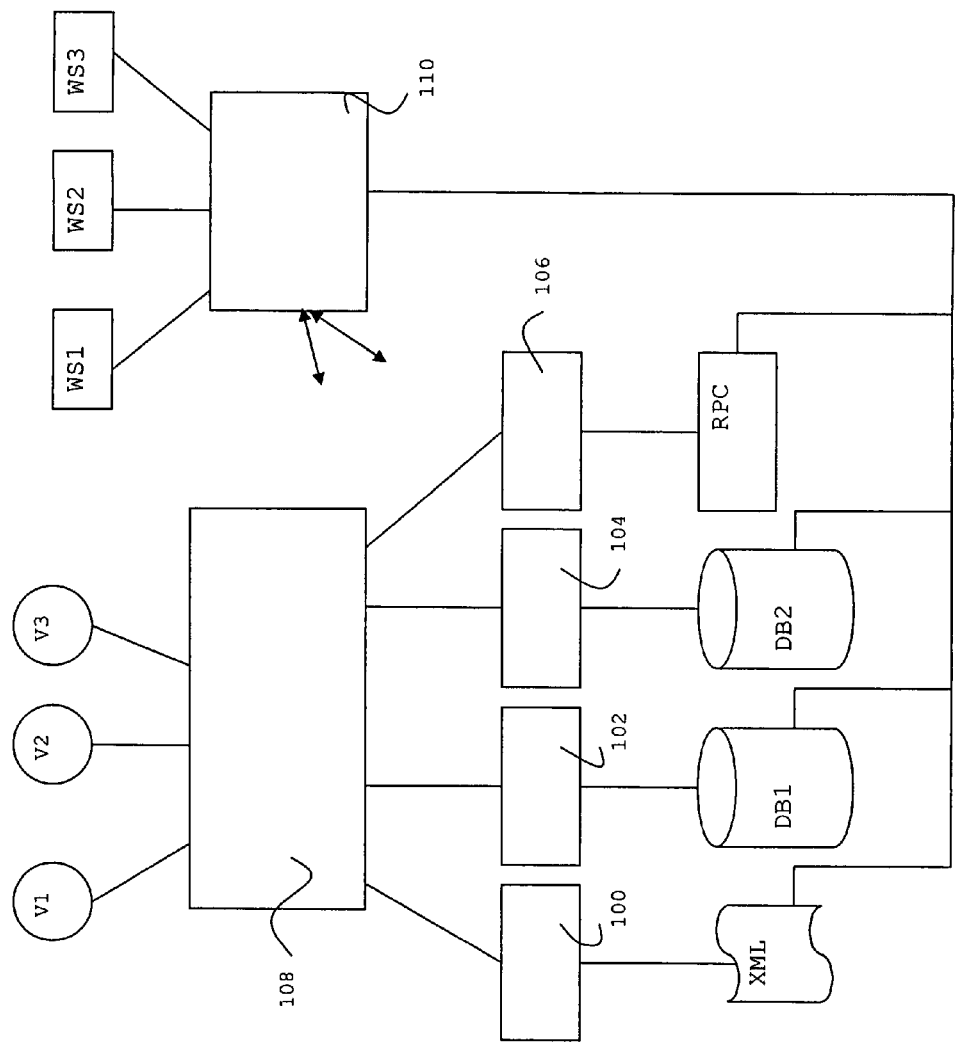
FIG. 1 shows a general view of the enterprise information integration platform.

Content
1. General view of the system
2. Introduction to F-Logic
3. Mapping
3.1. Mapping of databases
3.1.1. Mapping of relational databases to a source ontology
3.2. XML Mapping
3.2.1. Mapping XML parameters with complexContent to ontology
3.3. Web service mapping
3.3.1. Grounding of input variables
4. External views defined as parameterized queries
5. Publication as web service
Appendix A An example of a web service schema of a web service
Appendix B The XML schema included in the web service description of the web service according to Appendix A
Appendix C A SOAP request for the web service according to Appendix A 1. General View of the System FIG. 1 shows a general view of the enterprise information integration platform. Shown are a number of data sources XML, DB1, DB2, and RPC, RPC denoting a remote procedure call and standing for a web service. There is a source ontology 100, 102, 104, and 106 corresponding respectively to every data source. The source ontologies are integrated into an integration ontology 108. The integration ontology and the underlying structures can be accessed via predefined external views V1, V2, and V3. Corresponding to these external views are web services WS1, WS2, and WS3. These web services can be used to input queries into the system. The inference or runtime unit 110 is used for answering the queries. To this end, it translates the queries input via the web services into queries in the query language of the integration ontology 108. Also, it dynamically accesses the ontology structure 100, 102, 104, 106, and 108 and the corresponding rules to answer the query. Part of the rules is the mapping between the source ontologies 100, 102, 104, and 106 and the individual data sources. These mappings contain built-ins for accessing the data sources. The runtime engine 110, while evaluating the query using the rules, directly accesses the external data sources.

According to a first exemplary embodiment, the invention comprises a system, preferably a computer system, for unified querying of distributed data sources conforming to different data schema.

The system comprises a plurality of data sources conforming each to a given data schema. The different data schema of the data sources can e.g. be a relational database, an XML text, a web service, etc. The different data sources can be stored in different storage means, on different computers in a network, at different plants, or on one computer or one hard disk drive.

Each data schema has constructs for organizing the data and a data schema query language, like SQL, XQuery, a remote procedure call of an API of a web service, etc.

The system also comprises a plurality of source ontologies, each corresponding to one data source. Each source ontology comprises a group of constructs. Generally, the group of constructs comprises at least classes and properties of the classes. Sometimes in the literature, the classes are called "categories" and the properties are called "attributes". Usually, also object properties or relations among classes and the inheritance of datatype properties are incorporated into the ontologies.

The data are called instances of the classes. In other words: classes are sets and the data/instances are members of the sets.

The object model is preferably realized as a hierarchical structure of classes. Within hierarchical structures, the classes in a predetermined level are respectively allocated to precisely one class of a superior level, meaning only single inheritances are permitted. In general, the class structure can also be more generally embodied as an acyclic graph for which multiple inheritances are permitted.

An example for a class can be the class "person". An example of a property for the class person is the "name" of a person. Classes or data can be linked via object properties. E. g., person A is "cooperating with" person B.

A mapping between each data source and its corresponding source ontology is defined. With the help of the mapping, constructs of the data schema of the data source are mapped to constructs of the source ontology. E.g. for a relational database schema, tables are generally mapped to classes of the source ontology and fields of tables are generally mapped to properties of the classes.

The mapping between each data source and its corresponding source ontology is accomplished using a declarative system of rules based on predicate logic. One important characteristic of a declarative system of rules is that the result of an evaluation of the rules does not depend on the sequence of the definition of the rules.

The mapping comprises means for querying the data source with the data schema query language of the data source.

Furthermore, the system comprises an integration ontology. Again, the integration ontology comprises a group of constructs, generally at least classes and properties.

In a preferred embodiment, the integration ontology has an ontology query language associated therewith. The ontology query language of the integration ontology does not necessarily have to be the same as that of the source ontologies, although it usually is, for practical reasons.

The system provides a mapping between each source ontology and the integration ontology. In intuitive words, the integration ontology is a top level or global ontology. Using the mapping constructs of the source ontologies are mapped to constructs of the integration ontology. It is the integration ontology which gives a unified view on the data. It enables the information integration.

The mapping does not necessarily map a class of a source ontology to a class of the integration ontology and an property to an property. The ontologies can have different structures, which might make it more appropriate in individual cases to map a certain class to an property. E. g. one source ontology may have the class "laser-printer" while the integration ontology may have the class "printers" with the property "type", an instance (realization, data) of which could be "laser-printer".

Again, the mapping between the source ontologies and the integration ontology is accomplished using a declarative system of rules based on predicate logic.

The system also comprises query means for inputting a query related to the data of the data sources.

Finally, there is at least one inference unit based on predicate logic for evaluating the query with the help of the rules. It is the inference unit that answers the query. For this purpose, the inference unit evaluates the rules, it chooses those rules, which are suitable for answering the question. In a top-down-approach, the rules successively lead from the integration ontology to the relevant source ontologies. Furthermore, the rules mapping the relevant source ontology to the corresponding data source comprise means for querying that data source with the data schema query language of that data source. These means translate queries into the language of the data schema. These queries can be answered and the results returned. These results are used by the inference unit to answer the query posed on the web service level. Thus, the inference unit serves as runtime unit for answering queries. Using the information from the ontologies and the rules it directly queries the underlying data sources. It is a separate unit and not part of the ontology structure.

The main advantages of the system over the prior art resides in the powerful and flexible capabilities of the rules used for the mapping. Structures can be transformed; constructs can be renamed; values can be changed, transformed or calculated with.

The system based on ontologies and declarative rules offers unequalled possibilities of modelling data and know-how.

Also, it is easy to integrate a new data source with a new data schema into the system. It suffices to define a mapping between a new source ontology and the new data schema. The mapping between the source ontology and the integration ontology then does not require new programming know-how; pure modelling suffices.

To achieve many of the advantages of the system, it is important to base the system on predicate logic or rules based on predicate logic and not on business rules, which are often used in the prior art. This may need some explanation. If we restrict predicate logic to horn logic with negation (normal logic) then business rules and normal logic rules seem to be closely related at least from their surface representation, i.e. from their syntax. In contrast their underlying background theory are fundamentally different. Normal logic is based on a well-defined theory: the model theory of predicate logic. A Herbrand model is a (sometimes infinite) set of facts. The meaning of a set of normal logic rules and facts is defined by a unique minimal Herbrand model. So, loosely spoken, a set of normal logic rules and facts is an abbreviation for a set of facts, the minimal Herbrand model. This minimal Herbrand model is defined independently from the given sequence of the rules, from the given sequence of the rule bodies and independently from the inference algorithm to compute this model. For the meaning of business rules no theory is available. The meaning of a set of business rules is given by a simple inference algorithm: the Rete algorithm. The outcome of this algorithm is strongly dependent on the sequence of the rules, the sequence of the rule bodies and the operations used in the rule heads. So there is no independent theory what a set of rules means, but it has to be waited for an answer of the inference algorithm to get an idea of what the set of rules does. To make things worse, every business rule system behaves differently.

To enhance the ease of use of the present system, the source ontology corresponding to a data source and its data schema can be automatically generated. The same applies for the automatic generation of the mapping between a source ontology and its corresponding data source.

As mentioned, predicate logic may be used to define ontologies and mappings between them in an unambiguous way. These models can be executed directly using an inference engine. Thus, there is no loss of information or reinterpretation of information during the implementation phase and, thus, the execution corresponds to the original meaning and, additionally, the execution may be started immediately.

To speed up working with the system, the inference unit, which serves as runtime engine, can dynamically access the rules and the structure of the ontologies during the evaluation of a query. A way to accomplish this is given, when the inference unit accesses the data structure in which the model is stored. This allows for dynamically modelling the data integration and at the same time querying the modelled structure. Thus, the model can be tested. Also, knowledge engineers and users of the system can work on the system at the same time.

In a preferred embodiment, the integration ontology has an ontology query language associated therewith and the system comprises means for translating each query into the ontology query language of the integration ontology.

To further improve the flexibility and performance of the system, at least one of the ontologies is complemented by a declarative system of rules based on predicate logic for expressing additional information.

To conform to a widespread standard, the system comprises in a preferred embodiment at least one query unit in the form of a web service for inputting a query relating to the integration ontology. This query is translated from the web service input to the ontology query language of the integration ontology, allowing unified queries of the distributed data. In general, for all relevant queries a separate web service is defined.

In order to make as much use as possible of the capabilities of the data schema query language and to speed up the evaluation of queries, the system comprises means for identifying queries or rules or combinations of rules that can be combined into a complex query in the data schema query language of the data source and means for translating these queries or rules or combinations of rules into a complex query in the data schema query language of the data source. E.g. for a relational database, queries combining different tables and field and their entries can be identified and translated into a corresponding SQL query.

To further accelerate the evaluation of queries during runtime, the system comprises means for dynamically filtering those data or rules or queries which cannot have an impact on answering the query posed on the web service level.

To better serve the needs of different user groups, the system can comprise a plurality of integration ontologies, integrating different data sources or integrating identical data sources and representing each a different view on the data.

2. Introduction to F-Logic

For the formulation of queries, often the logic language F-Logic is a useful ontology query language (see, e.g., J. Angele, G. Lausen: "Ontologies in F-Logic" in S. Staab, R. Studer (Eds.): Handbook on Ontologies in Information Systems. International Handbooks on Information Systems, Springer, 2003, page 29). In order to gain some intuitive understanding of the functionality of F-Logic, the following example might be of use, which maps the relations between well-known biblical persons.

First, we define the ontology, i.e. the classes and their hierarchical structure as well as some facts:

```
abraham:man.
sarah:woman.
isaac:man[fatherIs->abraham; motherIs->sarah].
ishmael:man[fatherIs->abraham; motherIs->hagar:woman].
jacob:man[fatherIs->isaac; motherIs->rebekah:woman].
esau:man[fatherIs->isaac; motherIs->rebekah].
```

Obviously, some classes are defined: "man" and "woman". E.g., Abraham is a man. The class "man" has the properties "fatherIs" and "motherIs", which are indicating the parents. E.g., the man Isaac has the father Abraham and the mother Sarah. In this particular case, the properties are object properties.

Although F-Logic is suited for defining the class structure of an ontology, nevertheless, in many cases, the ontology languages RDF or OWL are used for these purposes.

Further, some rules are given, defining the dependencies between the classes:

```
FORALL X,Y X[sonIs->>Y] <- Y:man[fatherIs->X].
FORALL X,Y X[sonIs->>Y] <- Y:man[motherIs->X].
FORALL X,Y X[daughterIs->>Y] <- Y:woman[fatherIs->X].
FORALL X,Y X[daughterIs->>Y] <- Y:woman[motherIs->X].
```

Rules written using F-Logic consist of a rule header (left side) and a rule body (right side). Thus, the first rule in the example given above means in translation: If Y is a man, whose father was X, then Y is one of the (there might be more than one) sons of X. The simple arrow "->" indicates that, for a given datatype or object property, only one value is possible, whereas the double-headed arrow "->>" indicates that more than one value might be assigned to a property.

Finally, we formulate a query, inquiring for all women having a son whose father is Abraham. In other words: With which women did Abraham have a son?

```
FORALL X,Y<-X:woman[sonIs->>Y[fatherIs->abraham]].
```

The syntax of a query is similar to the definition of a rule, but the rule header is omitted.

The answer is:

X=sarah
X=hagar

3. Mapping 3.1. Mapping of Databases

For the mapping of databases, a special built-in is defined. This built-in allows the access of the database. It creates e.g. SQL queries to the data of the database. The built-in is incorporated into the mapping rule.

The following example illustrates accessing a database on an MS SQLServer as database type, running on a special computer or port called "host". The database contains a table "Person" containing information on the "Id" of the person, its "name" and its "town". The mapping rule has the form:

> X:Person[hasName->Y; livesInTown->Z]<-dbaccess
> ("MS SQL",host,Person,f(Id,X,Name,Y,Town,
> Z)).

3.1.1. Mapping of Relational Databases to a Source Ontology

A relational database consists of a set of tables. Every table consists of a fixed number of named columns. For each column a data type is given. The contents of a table must conform to these data types. For a row in a table a (unique) key may be given identifying one row in an unambiguous way. This key may consist of the values of some columns or may be a separate additional value like a number. Foreign keys define links into other tables; they refer to the keys of other tables and, thus, represent object properties.

The mapping of a relational database to its corresponding source ontology is defined as follows:

Every table is mapped to a class in the ontology.

Every column of a table, which does not represent a foreign key, i.e. which does not represent a relation, is mapped to a datatype property of the corresponding class of the ontology.

Every column which represents a foreign key is mapped to a binary relationship of the ontology.

Every row in a table is mapped to an instance of the ontology. The unique identifier of the instance is generated from the key of the row or from all values within the row, if no key is available.

The values within the row are mapped to the mentioned datatype property values and object properties.

The source ontology and the mapping may be generated automatically for the data schema of the relational database in the following way:

The class names are the table names.

The property names are the names of the columns.

If there is a primary key, then the unique identifiers for the instances are generated from the database name, the database location, the table name plus the primary key.

If there is no unique key, all the values v1, ..., vn in a row are used to create a unique key by concatenating the values.

The values of the properties of an instance are directly given by the values in the row.

Object properties are created by the mentioned key transformations of the foreign key.

Let us give an example: The table "person" contains columns "id", "name", "city", "street", "zip", "married". The "id" is the key. The table contains a data entry "1", "Peter", "New York", "King street", "12", "2".

The corresponding source ontology looks like the following (in F-Logic):

> Person[
>   name=>STRING;
>   city=>STRING;
>   street=>STRING;
>   zip=>NUMBER;
>   married=>Person].

The mapping of the table to the concept "Person" is given by the following rule:

> f(database,person,X):Person[id->X; name->Y; city->Z; street->U; zip->V; married-> f(database,foreigntablename,W)] <- dbaccess (database, person, access(id,X,name,Y,city,Z,street,U, zip,V,married,W)).

The source ontology as well as the mappings from the tables to the source ontology can, thus, be generated automatically.

3.2. XML Mapping

A mapping is needed between XML instances and F-Logic instances or constructs of the source ontologies.

For an XML documents an XML schema can be generated, which contains the data type definitions of the data contained in the XML document. Using such an XML schema, the corresponding XML document can be validated, i.e. the data in the document can be checked under the aspect, whether they conform to the correct data type. The validation process generates an annotated version of the XML document, containing for every element or XML instance a PSVI instance (PSVI=post schema validation info set), which is a reference to the suitable data type from the XML schema. The PSVI instance contains information on the data type of the XML instance.

For now, we consider XML instances with XML schema, which have fixed schema at design time. XML instances are given with PSVI instances, which annotate type information and abstracts from the concrete lexical XML representation.

The mapping should preserve as much as possible information. However it is acceptable, if some information is lost, because the effort to preserve this is too high, e.g.

Constraints of complex content models via nested sequence, choice or all model groups.

MinOccurs and MaxOccurs constraints with other cardinality as 0, 1 and unbounded.

There is a schema-driven mapping of XML element nodes with associated XML schema constructs to ontology instances and schema.

The mapping is defined as follows:

XML simpleType element declarations are mapped to a datatype property definitions of the ontology (like columns from tables).

XML complexType definitions are mapped to ontology class definitions.

XML complexContent element declarations are mapped to object property definitions of the ontology.

XML simpleContent element declarations with attributes are mapped to object property definitions of the ontology.

Figure 3:
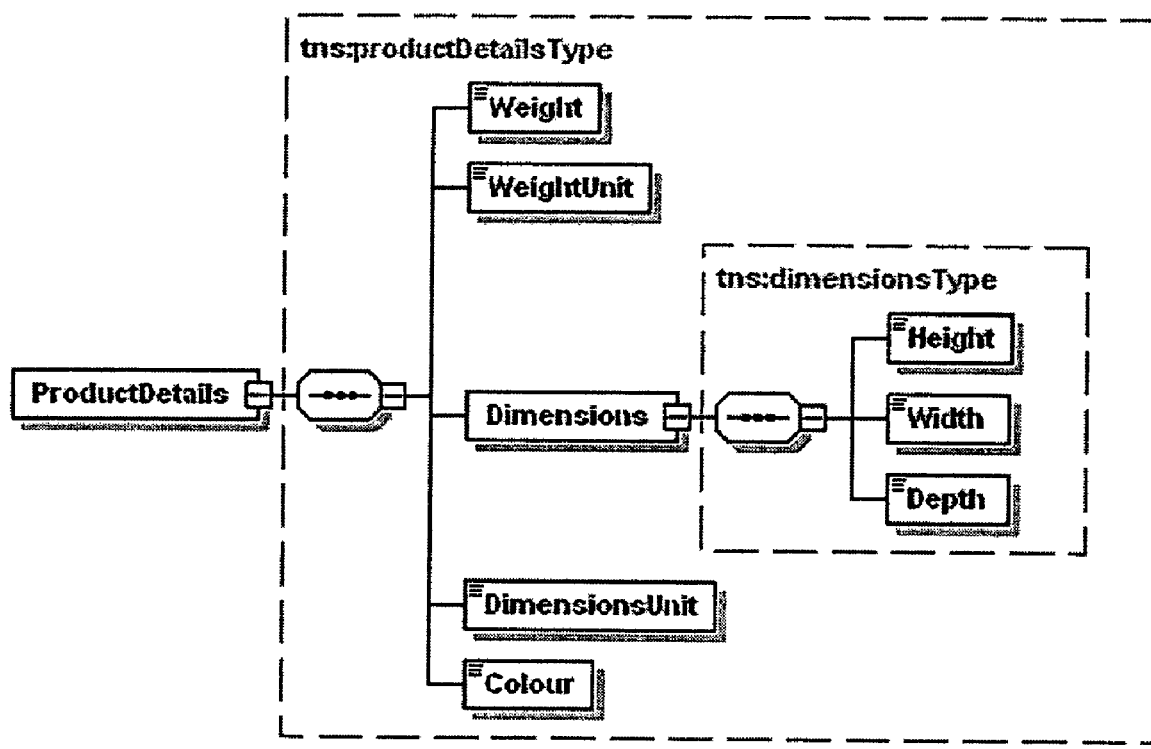
FIG. 3 shows an exemplary data structure.

The mapping is illustrated by the following example. The XML schema of the example is illustrated with the catalog schema in Appendix B. The structure can be seen in FIG. 3.

It follows an example XML document, which fits to the schema.

> <ProductDetails ="tns:productDetailsType"xmlns="http://www.example.com/ProductCatalog.xsd"
> xmlns:xsi="http://www.w3.org/2001/XMLSchema-instance"
> xmlns:tns="http://www.example.com/ProductCatalog.xsd"
> xmlns:xs="http://www.w3.org/2001/XMLSchema"
> xsi:schemaLocation="http://www.example.com/ProductCatalog.xsd -continued

```
ProductCatalog.xsd">
    <Weight>25</Weight>
    <WeightUnit>kg</WeightUnit>
    <Dimensions>
        <Height>27</Height>
        <Width>24</Width>
        <Depth>21</Depth>
    </Dimensions>
    <DimensionsUnit>cm</DimensionsUnit>
    <Colour transparency="50">red</Colour>
</ProductDetails>
```

For this XML schema with simple and complexType element declarations the following ontology is generated—expressed in the language F-Logic for this example:

```
productDetailsType[ ].
dimensionsType[ ].
productDetailsType[Weight=>xsd#INTEGER;
    WeightUnit=>xsd#STRING;
    Dimensions=>>dimensionsType;
    DimensionsUnit=>xsd#STRING;
    Colour=>colourType].
dimensionsType[Height=>xsd#INTEGER;
    Width=>xsd#INTEGER;
    Depth=>xsd#STRING].
colourType[value=>xsd#STRING;
    transparency=>xsd#INTEGER].
```

The XML mapping maps the above XML instances to the following ontology instances:

```
instance2productDetailsType:productDetailsType.
instance2productDetailsType[Weight->>"24,6";
    WeightUnit->>"pounds";
    Dimensions->>instance4dimenstionsType;
    DimensionsUnit->>"inches";
    Colour->>instance5ColourType].
instance4dimensionsType:dimensionsType.
instance4dimensionsType[Width->>24.0;
    Depth->>21.0;
    Height->>26.0].
instance5ColourType:ColourType.
instance5ColourType[value-> "red";
    transparency->>50].
```

Figure 2:
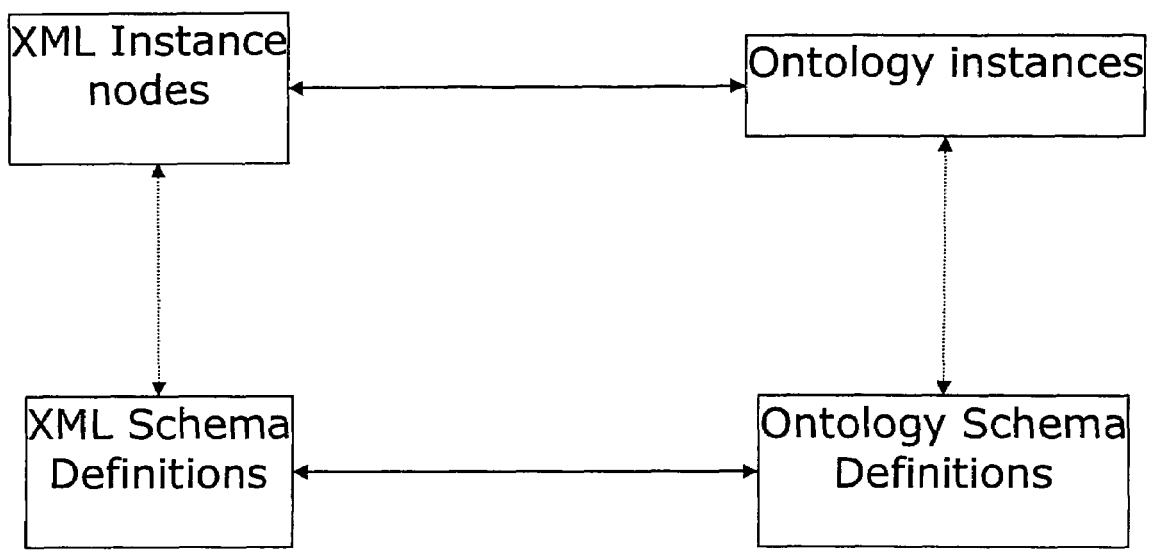
FIG. 2 shows a general overview of the mapping of XML data structures to ontologies.

FIG. 2 shows a general overview of the mapping of XML data structures to ontologies. Schema definitions are mapped to schema definitions and instances are mapped to instances.

This is done by a generic built-in, which has the XML schema information and its mapping to ontology definitions as input. By accessing the XML instances this built-in has, therefore, all the information to construct the corresponding ontology instances given as variables with ontology schema information. This is done according to the schema-driven mapping specified above.

Based on this generic XML built-in the mapping is realized by generated F-Logic mapping rules, which map the generated ontology classes and properties to the corresponding XML constructs with the help of this XML built-in. The following is an example of such a generated rule:

```
FORALL VAR0,VAR1,VAR2,VAR3,VAR4,VAR5 (
    id("productDetailsType",VAR0):
        productDetailsType[
            Weight ->> VAR1;
            WeightUnit ->> VAR2;
            Dimensions ->> VAR3;
            DimensionsUnit ->> VAR4;
            Colour ->> VAR5]
    <-
        XMLBuiltin("datasource-URL",VAR0
            "XMLSchemaDefiniton", "MappingToOntology",
            F(VAR1,VAR2,VAR3,VAR4,VAR5))
```

This built-in generates XQueries. The XML results of the XQueries are mapped to ontology instances according to this rule.

3.2.1. Mapping XML Parameters with complexContent to Ontology

Generally, a web service method itself can be mapped to a class (concept) of a source ontology with all its parameters being mapped to datatype or object properties. SimpleType XML element declarations can be mapped like tables, i.e. they can be mapped to datatype or object properties in a straight forward way. The problems are parameters with complexContent.

The following table 1 defines a mapping from XML element nodes with XML schema information including complexContent to F-Logic/ontology schema (the ontology being expressed in F-Logic).

TABLE 1

| XML schema | F-Logic schema |
|---|---|
| named complexType | Class with properties for all elements and attributes contained in the content model of the complexType. Model groups (sequence, choice, all) are ignored |
| `<xs:complexType name="productDetailsType">`<br>  `<xs:sequence>`<br>    `<xs:element name="Weight" type="xs:int"/>`<br>    `<xs:element name="WeightUnit" type="xs:string"/>`<br>    `<xs:element name="Dimensions"`<br>`type="tns:dimensionsType"/>`<br>    `<xs:element name="DimensionsUnit" type="xs:string"/>`<br>  `</xs:sequence>`<br>`</xs:complexType>` | productDetailsType[<br>  Weight => xs#NUMERIC;<br>  WeightUnit => xs#STRING;<br>  Dimensions => DimensionsUnitType] |

TABLE 1-continued

| XML schema | F-Logic schema |
|---|---|
| Anonymous complexType | class with generated name from path to complexType:<br>for anonymous complexType enclosing element name is used |
| ```<xs:complexType   name="productDetailsType"><br>  <xs:sequence><br>...<br>    <xs:element name="Unit"><br>      <xs:complexType><xs:sequence><br>        <xs:element name="unitName" type="xs:string"/><br>        <xs:element name="unitSpecification" type="xs:anyURI"/><br>      </xs:sequence></xs:complexType><br>    </xs:element><br>...<br></xs:sequence><br></xs:complexType>``` | productDetailsType.Unit[<br>   unitName => xs#STRING;<br>   unitSpecification => xs#STRING] |
| element with complexContent | objectProperty with range of class for complex Type, i.e. a relation |
| ```<xs:element name="ProductDetails" type="tns:productDetailsType"/><br><xs:complexType   name="productDetailsType"><br><xs:sequence><br><xs:element name="Weight" type="xs:int"/><br><xs:element name="WeightUnit" type="xs:string"/><br><xs:element name="Dimensions" type="tns:dimensionsType"/><br>  <xs:element name="DimensionUnit" type="xs:string"/><br></xs:sequence><br></xs:complexType>``` | [..<br>ProductDetails => productDetailsType<br>]<br>productDetailsType[<br>  Weight => xs#NUMERIC;<br>  WeightUnit => xs#STRING;<br>  Dimensions => DimensionsUnitType;<br>  DimensionUnit => xs#STRING<br>]<br>DimensionsUnitType[<br>  Height=>xs#NUMERIC;<br>  Width-> xs#NUMERIC;<br>  Depth-> xs#NUMERIC;] |
| element with simpleContent | datatypeProperty |
| `<xs:element name="Height" type="xs:int"/>` | [weight=>xs:int] |
| Attribute | datatypeProperty with name prefix @ |
| `<xs:e anAttribute="EUR" type="xs:string"/>` | [@anAttribute=>xs#STRING] |
| MinOccurs = 0<br>MaxOccurs > 1 | =><br>== > |
| subtyping | subtype |
| ```<xs:complexType name="Employee"><br>  <xs:complexContent><br>    <xs:extension base ="Person"><br>      <xs:sequence><br>      <xs:element name = "loan" type="xs:string">``` | Employee::Person[<br>load => xs#integer<br>] |
| Wildcard element with complexContent | No specific property definition for class |
| ```<xs:element name="ProductDetails"><br><xs:complexType   name="productDetailsType"><br>  <xs:sequence><br>    <xs:any maxOccurs="unbounded"/><br>  </xs:sequence><br></xs:complexType><br></xs:element>``` | [..<br>ProductDetails => productDetailsType<br>] |

The following table 2 defines a mapping from XML element nodes with XML schema information including complexContent to F-Logic/ontology instances (the ontology being expressed in F-Logic).

TABLE 2

| XML instance (PSVI) | F-Logic instance |
|---|---|
| Complex content of an element with specified xsi:type from PSVI | Object with generated object identifier (referenced by object property) |
| `<ProductDetails xsi:type="productDetailsType">`<br>`  <Weight>24.6</Weight>`<br>`  <WeightUnit>pounds</WeightUnit>`<br>`  <Dimensions>`<br>`    <Height>26</Height>`<br>`    <Width>24</Width>`<br>`    <Depth>21</Depth>`<br>`  </Dimensions>`<br>`  <DimensionUnit>inches</DimensionUnit>`<br>`</ProductDetails>` | productDetailsType(id1):productDetailsType[<br>  Weight->24.6;<br>  WeightUnit->"pounds";<br>  Dimensions->DimensionsUnitType(id2)<br>DimensionsUnitType(id2): DimensionsUnitType[<br>    Height->26;<br>    Width-> 24;<br>    Depth->21] |
| Complex content element node without named type | Object with generated object identifier (referenced by object property) |
| `<Unit>`<br>`  <unitName>kg`<br>`  </unitName>`<br>`  <unitSpecification>http://www.std.org/unit/measures`<br>`  </unitName>`<br>`</Unit>` | productDetailsType.Unit(Obj1):<br>productDetailsType.anType1[ unitName -> "kg";<br>  unitSpecification -><br>"http://www.std.org/unit/measures"] |
| complexContent element node | object type property instance |
| `<ProductDetails xsi:type="productDetailsType">`<br>`  <Weight>24.6</Weight>`<br>`  <WeightUnit>pounds</WeightUnit>`<br>`  <Dimensions>`<br>`    <Height>26</Height>`<br>`    <Width>24</Width>`<br>`    <Depth>21</Depth>`<br>`  </Dimensions>`<br>`  <DimensionUnit>inches</DimensionUnit>`<br>`</ProductDetails>` | [..<br>ProductDetails -> productDetailsType(id1)<br>]<br>productDetailsType(id1):productDetailsType[<br>  Weight->24.6;<br>  WeightUnit->"pounds";<br>  Dimensions->DimensionsUnitType(id2) ;<br>  DimensionUnit -> "inches"<br>]<br>DimensionsUnitType(id2): DimensionsUnitType[<br>    Height->26;<br>    Width-> 24;<br>    Depth->21] |
| Element | datatypeProperty |
| `<weight xsi:type="xs:integer>4711`<br>`</weight>` | [weight->4711] |
| XML Attribute node | Datatype Property instance |
| `<e anAttribute="EUR"> </e>` | [@anAttribute->"EUR"] |
| Assumption: XML element without any type annotation | Object property instance |
| `<ProductDetails`<br>`  <Weight>24.6</Weight>`<br>`  <WeightUnit>pounds</WeightUnit>`<br>`    <DimensionUnit>inches</DimensionUnit>`<br>`</ProductDetails>` | [..<br>ProductDetails -> GeneralWSInstance(id1)<br>]<br>GeneralWSInstance(id1):GeneralWSInstance[<br>Weight->24.6;<br>WeightUnit->"pounds";<br>Dimensions->GeneralWSInstance(id2) ;<br>DimensionUnit -> "inches"<br>] |

The following schema concepts are ignored:

differences in the model groups sequence, choice and all mixed content.
  Not mapped XML Nodes:
  Processing Instruction nodes and
  Comments

3.3. Web Service Mapping

Web services can be considered as remote procedure call (RPC) with a list of input parameters and a list of output parameters, which contain the result.

E. g. a web service who delivers the current temperature of a city may have as input parameter the zip code and as output parameter the temperature. A corresponding source ontology would have a class "place" with two properties: "zip code" and "temperature".

We consider only document style web services where all input parameters are contained in a single XML element of the input message and all output parameters in a single XML element of the output message. The XML elements are described by XML schema definitions. The Web services are described by WSDL (web service description language), which references XML schema definitions.

Appendix A contains the following example defining a web service getProductDetails, which uses elements of the same schema we used in the description of the XML mapping.

A web service operation is mapped to an ontology class, which has the element of the input message and the element of the output message as object properties. The content of these elements are mapped like specified in the XML mapping above to ontology definitions. Therefore, the above web service will result in the following ontology definitions.

```
// CLASSES-------------------
    getProductDetailsOperation[ ].
    productDetailsType[ ].
    dimensionsType[ ].
    getProductDetailsType[ ].
// PROPERTIES ------------------
    getProductDetailsOperation[
        ProductNumber=>ProductNumberType;
        ProductDetails=>productDetailsType].
    productDetailsType[Weight=>xsd#INTEGER;
        WeightUnit=>xsd#STRING;
        Dimensions=>>dimensionsType;
        DimensionsUnit=>xsd#STRING;
        Colour=>colourType].
    dimensionsType[Height=>xsd#INTEGER;
        Width=>xsd#INTEGER;
        Depth=>xsd#STRING].
    colourType[value=>xsd#STRING;
        transparency=>xsd#INTEGER].
```

In Appendix C there is an example SOAP request according to the given WSDL definitions. SOAP stands for "Simple Object Access Protocol"; it is a lightweight XML-based messaging protocol used to encode the information in Web service request and response messages before sending them over a network.

The web service mapping maps this SOAP request of the web service above to the following ontology instances. Please note that only the first instance is special to the web service mapping. All other instances are the same as in the XML mapping example.

```
instance1GetProductDetailsOperation:getProductDetailsOperation.
instance1GetProductDetailsOperation[ProductNumber->>605001;
    ProductDetails->>instance2productDetailsType].
instance2productDetailsType:productDetailsType.
instance2productDetailsType[Weight->>"24,6";
    WeightUnit->>"pounds";
    Dimensions->>instance4dimenstionsType;
    DimensionsUnit->>"inches";
    Colour->>instance5ColourType].
instance4dimenstionsType:dimensionsType.
instance4dimenstionsType[Width->>24.0;
    Depth->>21.0;
    Height->>26.0].
    instance5ColourType:ColourType.
    instance5ColourType[value-> "red";
    transparency->>50].
```

A generic built-in "webservice" realizes the transformation of the corresponding SOAP request to the ontology instances according to the mapping specified above. The built-in gets the WSDL description and its mapping to ontology definitions as input. From that it constructs ontology instances from the result of the SOAP request.

Based on this generic web service built-in the mapping is realized by generated F-Logic mapping rules, which map the generated ontology classes and properties to this web service built-in. The following is an example of such a generated rule:

```
FORALL PN,PD
    getProductDetailsOperation(PN):getProductDetailsOperation
        [ProductNumber->PN; ProductDetails->PD]
    <- webservice("http://www.example.com/Products",
        input("ProductNumber",PN),
        output("ProductDetails",PD))
```

Appendix A to C show a web service with a web service description with a corresponding SOAP request and how this is mapped to ontology schemas and instances.

3.3.1. Grounding of Input Variables

In order for a web service to be able to produce a result or an output, the input must be well defined. The input may not contain variables; all variables must have assigned values. In other words, all variables must be "grounded". A property of an ontology is "grounded" if there is an instance or value for this property.

The following example will illustrate the grounding of properties. An example for mapping product details from a web service to an ontology is given by the following rule:

```
FORALL PN, PD
        getProductDetailsOperation(PN):
        getProductDetailsOperation[
        ProductNumber->PN; ProductDetails->PD]
    <- webservice(http://
        www.example.com/Products,
            input("ProductNumber",PN),
            output("ProductDetails",PD)).
```

Because the product number is the input for the web service, there must be a value for it, it must be grounded. If there is an additional rule mapping the source ontology to the integration ontology like:

```
FORALL X,Y
        X:Product[PoNumber->Y] <-
        X:getProductDetailsOperation[ProductNumber->Y].
``` then also the datatype property "PONumber" of the integration ontology must be grounded. On the other hand, a query checking for the availability of a product number like:

FORALL X<-X:Product[PoNumber->5].

is executable, because the value 5 is a grounded value and, thus, the input for the web service, input ("ProductNumber", 5) is grounded and the web service can be executed.

For this, an extension of ontology definitions can be defined, which mark object or datatype properties of an ontology class as grounded. Only queries to these ontology elements are allowed, in which these elements are grounded either directly or via equality to other grounded properties. Those property definitions which are dependent either directly or indirectly (via rules) on the output of the WSDL operation are grounded, if the input is grounded, or in other words: are marked as having to be grounded. Property definitions dependent on the input of the WSDL are a priori not grounded.

E.g., a query to the integration ontology which queries for all product numbers is not allowed:

FORALL X,Y<-X:Product[PoNumber->Y].

As the datatype property "PoNumber" is not grounded, there is no value (propagated through the rules) available for the input parameter of the web service built-in. Thus, the web service cannot be executed and the query cannot be answered.

Another way to solve this problem is by instruction of the inference engine. In this embodiment, the inference engine knows which object or datatype properties have to be grounded (they must not be marked in the ontology) and rejects queries without an appropriate grounding. The inference engine propagates the grounded properties through the rule graph (system graph). Thus, the ontology need not be extended by a description which properties have to be grounded and which properties need not be grounded.

If some properties or classes of the integration ontology are grounded, this opens a way for an extended mapping in order to ground the part of the input message of the WSDL operation via the grounded ontology properties from the integration ontology. E. g., the mapping of a web service can be extended by feeding the input values of the web service with values from the integration ontology. If the integration ontology knows all possible product numbers (e.g. by a mapping from a database) these product numbers could be used as input for the web service:

```
FORALL PN, PD,X
    getProductDetailsOperation(PN):
    getProductDetailsOperation[
    ProductNumber->PN; ProductDetails->PD]
 <- X:Product[PoNumber->PN] and
    webservice(http://www.example.com/Products,
    input("ProductNumber",PN),
    output("ProductDetails",PD)).
```

Thus, the mapping is extended. Now the product numbers from the integration ontology are used for instantiating the variable PN with values and thus the input of the web service is grounded. This allows queries like FORALL X,Y<-X:Product[PoNumber->Y].

to be answered, because for all product numbers the ontology knows about (via e.g. the database mapping) the web service built-in can be executed.

4. External Views Defined as Parameterized Queries

Different external views on the integrated data can be defined by specifying predefined queries. They can be understood as predefined parameterized queries posed to the integration ontology and formulated in the query language of the integration ontology.

4.1. Example

Let us consider how a query posed on the web service input level will be transferred to the web service data source level. We will, again, consider the above given example of the web service getProductDetails.

We give an example query for an integration ontology containing the example web service Catalog in Appendix A:

```
Forall X,Y,Z,U <- X:getProductDetails[ProductNumber -> 50600;
    getProductDetails -> Y[Weight -> Z; WeightUnit -> U]].
```

5. Web Service Input

For every external view a corresponding web service access of the system can be defined, which allows the corresponding querying of the system. Such web services take—in the most general case—an XML document as input and generate an XML document as output or answer. Such web services are called "document style web services".

So, for the above given example of the web service getProductDetails, an input XML document might look like

```
<ProductNumber>
    123
</ProductNumber>
```

An output might look like

```
<ProductDetails>
    <Weight> 60 </Weight>
    <WeightUnit> kg </WeightUnit>
</ProductDetails>
```

A more detailed explanation will be given below.

While the present invention has been described and illustrated in conjunction with a number of specific embodiments, those skilled in the art will appreciate that variations and modifications may be made without departing from the principles of the invention as herein illustrated, as described and claimed. The present invention may be embodied in other specific forms without departing from its spirit or essential characteristics. The described embodiments are considered in all respects to be illustrative and not restrictive. The scope of the invention is, therefore, indicated by the appended claims, rather than by the foregoing description. All changes which come within the meaning and range of equivalence of the claims are to be embraced within their scope.

REFERENCES

XML data sources
DB1 data sources
DB2 data sources
RPC remote procedure call and standing for a web service
100 source ontology
102 source ontology
104 source ontology
106 source ontology
108 integration ontology
V1 external view
V2 external view
V3 external view
WS1 web service
WS2 web service
WS3 web service
110 runtime unit, inference engine

REFERENCES CITED

US 2004/0216030 A1
US 2004/0093559 A1
US 2004/0093344 A1
US 2003/0179228 A1
US 2003/0177481 A1
US 2003/0163597 A1
US 2003/0163450 A1

US 2003/0120665 A1
US 2003/0101170 A1
J. Angele, G. Lausen: "Ontologies in F-Logic" in S. Staab, R. Studer (Eds.): Handbook on Ontologies in Information Systems. International Handbooks on Information Systems, Springer, 2003, page 29 ff.
A. Van Gelder, K. A. Ross, and J. S. Schlipf: "The well-founded semantics for general logic programs"; Journal of the ACM, 38(3):620-650, July 1991.
J. D. Ullman: "Principles of Database and Knowledge-Base Systems"; vol. I, Computer Sciences Press, Rockville, Md., 1988.

APPENDIX A

Catalog Webservice

```
ProductCatalog.wsdl
<wsdl:definitions
xmlns:wsdl="http://schemas.xmlsoap.org/wsdl/"
xmlns:cat="http://www.example.com/ProductCatalog.xsd"
xmlns:tns="http://www.example.com/ProductCatalog.wsdl"
xmlns:xs="http://www.w3.org/2001/XMLSchema"
xmlns:soap="http://schemas.xmlsoap.org/wsdl/soap/" targetName-
space="http://www.example.com/ProductCatalog.wsdl">
    <wsdl:types>
        <xs:schema xmlns:xs="http://
              www.w3.org/2001/XMLSchema">
            <xs:import namespace="http://
                  www.example.com/ProductCatalog.xsd"
                  schemaLocation="ProductCatalog.xsd"/>
        </xs:schema>
    </wsdl:types>
    <wsdl:message name="getProductDetailsRequest">
        <wsdl:part name="request"
              element="cat:ProductNumber"/>
    </wsdl:message>
    <wsdl:message name="getProductDetailsResponse">
        <wsdl:part name="Body" element="cat:ProductDetails"/>
    </wsdl:message>
    <wsdl:portType name="CatalogPortType">
        <wsdl:operation name="getProductDetails">
            <wsdl:input name="getDetailsRequest"
                  message="tns:getProductDetailsRequest"/>
            <wsdl:output name="getDetailsResponse"
                  message="tns:getProductDetailsResponse"/>
        </wsdl:operation>
    </wsdl:portType>
    <wsdl:binding name="CatalogSoapBinding"
              type="tns:CatalogPortType">
        <soap:binding style="document" transport="http://
              schemas.xmlsoap.org/soap/http"/>
        <wsdl:operation name="getProductDetails">
            <soap:operation/>
            <wsdl:input>
                <soap:body parts="request" use="literal"/>
            </wsdl:input>
            <wsdl:output>
                <soap:body parts="Body" use="literal"/>
            </wsdl:output>
        </wsdl:operation>
    </wsdl:binding>
    <wsdl:service name="getProductDetails">
        <wsdl:port name="getProductPort"
              binding="tns:CatalogSoapBinding">
            <soap:address location="http://
                  www.example.com/getProductDetails"/>
        </wsdl:port>
    </wsdl:service>
</wsdl:definitions>
```

APPENDIX B

Catalog schema

```
ProductCatalog.xsd
<?xml version="1.0" encoding="UTF-8"?>
```

APPENDIX B-continued

Catalog schema

```
<xs:schema targetNamespace="http://
www.example.com/ProductCatalog.xsd"
xmlns:tns="http://www.example.com/ProductCatalog.xsd"
xmlns:xs="http://www.w3.org/2001/XMLSchema"
      elementFormDefault="qualified">
    <xs:element name="ProductNumber" type="xs:int"/>
    <xs:element name="ProductDetails"
              type="tns:productDetailsType"/>
    <xs:complexType name="productDetailsType">
        <xs:complexContent>
            <xs:restriction base="xs:anyType">
                <xs:sequence>
                    <xs:element name="Weight"
                          type="xs:int"/>
                    <xs:element name="WeightUnit"
                          type="xs:string"/>
                    <xs:element name="Dimensions"
                          type="tns:dimensionsType"/>
                    <xs:element name="DimensionsUnit"
                          type="xs:string"/>
                    <xs:element name="Colour"
                          type="tns:colourType"/>
                </xs:sequence>
            </xs:restriction>
        </xs:complexContent>
    </xs:complexType>
    <xs:complexType name="colourType">
        <xs:simpleContent>
            <xs:extension base="xs:string">
                <xs:attribute name="transparency"
                      type="xs:int"/>
            </xs:extension>
        </xs:simpleContent>
    </xs:complexType>
    <xs:complexType name="dimensionsType">
        <xs:complexContent>
            <xs:restriction base="xs:anyType">
                <xs:sequence>
                    <xs:element name="Height"
                          type="xs:int"/>
                    <xs:element name="Width"
                          type="xs:int"/>
                    <xs:element name="Depth"
                          type="xs:int"/>
                </xs:sequence>
            </xs:restriction>
        </xs:complexContent>
    </xs:complexType>
</xs:schema>
```

APPENDIX C

SOAP request

```
Input message
<SOAP-ENV:Envelope xmlns:SOAP-
ENV="http://schemas.xmlsoap.org/soap/envelope/" xmlns:SOAP-
ENC="http://schemas.xmlsoap.org/soap/encoding/"
xmlns:xsi="http://www.w3.org/2001/XMLSchema-instance"
xmlns:xsd="http://www.w3.org/2001/XMLSchema">
    <SOAP-ENV:Body>
        <tns:ProductNumber
xmlns:tns="http://www.example.com/ProductCatalog.xsd"
xsi:schemaLocation="http://www.example.com/ProductCatalog.xsd
ProductCatalog.xsd">50600</tns:ProductNumber>
    </SOAP-ENV:Body>
</SOAP-ENV:Envelope>
Output message
<SOAP-ENV:Envelope xmlns:SOAP-ENV="http://
          schemas.xmlsoap.org/soap/envelope/"
xmlns:SOAP-ENC="http://schemas.xmlsoap.org/soap/encoding/"
xmlns:xsi="http://www.w3.org/2001/XMLSchema-instance"
xmlns:xsd="http://www.w3.org/2001/XMLSchema">
    <SOAP-ENV:Body>
```

APPENDIX C-continued

SOAP request

```
<tns:ProductDetails
xmlns:tns="http://www.example.com/ProductCatalog.xsd"
xsi:schemaLocation="http://
    www.example.com/ProductCatalog.xsd ProductCatalog.xsd">
    <tns:Weight>25</tns:Weight>
    <tns:WeightUnit>kg</tns:WeightUnit>
    <tns:Dimensions>
        <tns:Height>27</tns:Height>
        <tns:Width>24</tns:Width>
        <tns:Depth>21</tns:Depth>
    </tns:Dimensions>
    <tns:DimensionsUnit>cm</tns:DimensionsUnit>
    <tns:Colour transparency="50">red</tns:Colour>
</tns:ProductDetails>
</SOAP-ENV:Body>
</SOAP-ENV:Envelope>
```

The invention claimed is:

1. A method for mapping an XML (eXtensible Markup Language) data structure to an ontology, wherein the method is encoded in program instructions that are recorded on and executed by at least one of a computing device and a co-processor device, the method comprising:
   providing an XML document with a corresponding XML schema definition;
   a) mapping XML schema declarations and definitions to ontology schema definitions by:
   mapping XML element and attribute declarations to ontology property definition; and
   mapping XML complexType definitions to ontology class definitions;
   a1) validating the XML document by the XML schema to generate a PSVI (post schema validation info set) annotation of the XML document;
   b) using the PSVI annotation from the validation of the XML document by the XML schema for mapping XML nodes with known PSVI-type to ontology instances by:
   mapping PSVI complexType annotations to ontology class instances;
   mapping element and attribute nodes to ontology property instances; and
   mapping XML nodes with a known PSVI-type in the following way to ontology instances:
   b1) for each XML element node with a complexType annotation an instance of a class of the ontology is generated, the class of this instance is the class to which this complexType definition is mapped;
   b2) mapping an XML simpleType element node to a datatype property instance of the ontology, the domain class instance of the datatype property instance being the instance which is generated for the PSVI type annotation where the element node is used;
   b3) mapping an XML simpleContent element node with an attribute to an object property instance of the ontology, the object property having a domain class instance and a range class instance, the domain class instance of the object property instance being the instance which is generated for the type annotation where the element is used, the range class instance of the object property instance being the class instance which is generated for the PSVI type annotation of the XML simpleContent element node;
   b4) mapping an XML complexContent element node to an object property instance of the ontology, the object property having a domain class instance and a range class instance, the domain class instance of the object property instance being the instance which is generated for the PSVI type annotation where the element is used, and the range class instance of the object property instance being the class instance which is generated for the PSVI type annotation of the XML complexContent element node;
   b5) mapping an XML simpleType attribute node to a datatype property instance of the ontology, the domain class instance of the datatype property instance being the instance which is generated for the PSVI type annotation where the attribute node is used;
   c) defining predefined ontology schema definitions by defining a predefined ontology class definition and a predefined ontology datatype property definition and a predefined object property definition;
   d) mapping XML nodes without PSVI-type annotation to ontology instances and to ontology definitions by mapping XML element and attribute nodes to ontology property instances of the predefined ontology property definitions and ontology class instances of the predefined ontology class definitions;
   e) wherein this mapping is performed dynamically while evaluating a query inquiring data from the XML document.

2. The method according to claim 1 comprising the steps of:
   a) mapping XML schema declarations and definitions to ontology schema definitions in the following way:
   a1) mapping an XSD (XML Schema Definition) complexType definition to a class definition of the ontology;
   a2) mapping an XSD complexContent element declaration of an XSD complexType definition to an object property definition of the ontology, the object property having a domain class and a range class, the domain class being the class where the element is used, and the range class of the object property being the class to which the complexType of the complexContent element is mapped;
   a3) mapping an XSD simpleType element declaration to a datatype property definition of the ontology, the datatype property having a domain class, the domain class being the class where the element is used, and the range type being the XML schema type of the simpleType element declaration;
   a4) mapping an XSD simpleContent element declaration with an attribute to an object property definition of the ontology, the object property having a domain class and a range class, the domain class being the class where the element is used, and the range class of the object property being the class to which the complexType of the simpleContent element is mapped;
   a5) mapping an XSD attribute declaration to a datatype property definition of the ontology, the datatype property having a domain class, the domain class being the class where the element is used, and the range type being the XML schema type of the attribute declaration.

3. The method according to claim 1 comprising the steps:
   c) defining the following predefined ontology schema definitions:
   c1) a single class definition which is a super class of all generated class definitions;
   c2) a single object property definition which is a super object property of all generated object property definitions, the object property having a domain class and a range class, which are said super class;
   c3) a single datatype property definition which is a super datatype property of all generated datatype definitions, the datatype property having a domain class which is said super class, range type being any atomic type.

4. The method according to claim 1 comprising the steps of:
   d) mapping XML nodes without PSVI-type annotation to ontology instances and ontology definitions in the following way:
   d1) for each XML element node which is not a leaf-node
   d1 a) an instance of the predefined super class of all generated classes of the ontology is generated; and
   d1 b) an object property instance of the predefined super object property is generated, the domain class instance of the object property instance being the instance which is generated for the containing element node and the range class instance being the class instance which is generated for this XML element node;
   d2) for each XML leaf element node without attribute nodes a datatype property instance of the predefined super datatype property is generated, the domain class instance of the datatype property being the instance which is generated for the containing element node;
   d3) for each XML leaf element node with an attribute node an object property instance of the predefined super object property is generated, the domain class instance of the object property being the instance which is generated for the containing element node, and the range class instance being the class instance which is generated for this element node;
   d4) for each XML attribute node a datatype property instance of the predefined super datatype property is generated, the domain class instance of the datatype property being the instance which is generated for the element node to which the attribute belongs.

5. A method for mapping document style web services to an ontology, wherein the method is encoded in program instructions that are recorded on and executed by at least one of a computing device and a co-processor device, the method comprising:
   providing an XML document with a corresponding XML schema definition;
   mapping XML schema declarations and definitions to ontology schema definitions by:
   mapping XML element and attribute declarations to ontology property definition; and
   mapping XML complexType definitions to ontology class definitions;
   validating the XML document by the XML schema to generate a PSVI annotation of the XML document;
   using the PSVI annotation from the validation of the XML document by the XML schema for mapping XML nodes with known PSVI-type to ontology instances by:
      mapping PSVI complexType annotations to ontology class instances; and
      mapping element and attribute nodes to ontology property instances;
   defining predefined ontology schema definitions by defining a predefined ontology class definition and a predefined ontology datatype property definition and a predefined object property definition; and
   mapping XML nodes without PSVI-type annotation to ontology instances and to ontology definitions by mapping XML element and attribute nodes to ontology property instances of the predefined ontology property definitions and ontology class instances of the predefined ontology class definitions,
   b) mapping XML nodes with a known PSVI-type in the following way to ontology instances:
   b1) for each XML element node with a complexType annotation an instance of a class of the ontology is generated, the class of this instance is the class to which this complexType definition is mapped;
   b2) mapping an XML simpleType element node to a datatype property instance of the ontology, the domain class instance of the datatype property instance being the instance which is generated for the PSVI type annotation where the element node is used;
   b3) mapping an XML simpleContent element node with an attribute to an object property instance of the ontology, the object property having a domain class instance and a range class instance, the domain class instance of the object property instance being the instance which is generated for the type annotation where the element is used, the range class instance of the object property instance being the class instance which is generated for the PSVI type annotation of the XML simpleContent element node;
   b4) mapping an XML complexContent element node to an object property instance of the ontology, the object property having a domain class instance and a range class instance, the domain class instance of the object property instance being the instance which is generated for the PSVI type annotation where the element is used, and the range class instance of the object property instance being the class instance which is generated for the PSVI type annotation of the XML complexContent element node;
   b5) mapping an XML simpleType attribute node to a datatype property instance of the ontology, the domain class instance of the datatype property instance being the instance which is generated for the PSVI type annotation where the attribute node is used;
   e) wherein this mapping is performed dynamically while evaluating a query inquiring data from the XML document.

6. The method according claim 5 characterized in that for mapping an XML web service to an ontology the following steps are performed:
   providing an XML SOAP (Simple Object Access Protocol) web service with a corresponding web service description (WSDL);
   a) mapping the WSDL definitions to ontology schema definitions in the following way:
   mapping an operation definition to a class definition of the ontology;
   mapping a part definition to an ontology property definition;
   b) the input and output message of the SOAP request are mapped in the following way to ontology instances:
   a single SOAP request is mapped to a single ontology class instance;
   the element nodes representing the parts of the input and output message are mapped to ontology property instances.

7. The method according to claim 6 comprising the steps of:
   a) mapping the WSDL definitions to ontology schema definitions in the following way:
   a1) mapping an operation definition to a class definition of the ontology;
   a2) if the part of the input or output message is defined as an complexContent element declaration, it is mapped to an object property definition of the ontology, the object property having a domain class and a range class, the domain class being the class which is mapped from the operation definition, and the range class of the object property being the class to which the complexType of the complexContent element is mapped;

a3) if the part of the input or output message is defined as an XSD simpleType element declaration without attributes, it is mapped to a datatype property definition of the ontology, the datatype property having a domain class, which is mapped from the operation definition and the range type being the XML schema type of the simpleType element declaration;

a4) if the part of the input or output message is defined as an XSD simpleContent element declaration with an attribute, it is mapped to an object property definition of the ontology, the object property having a domain class and a range class, the domain class being the class, which is mapped from the operation definition, and the range class of the object property being the class to which the complexType of the simpleContent element is mapped.

8. The method according to claim 6 comprising the steps of:

b) the input and output message of the soap request are mapped in the following way to ontology instances:

b1) for each SOAP request of an operation an instance of a class of the ontology is generated, the class of this instance is the class to which this operation definition is mapped;

b2) if the input or output message contains XML simpleType element node it is mapped to a datatype property instance of the ontology, the domain class instance of the datatype property instance being the instance which is generated for the operation of the SOAP request;

b3) if the input or output message contains an XML simpleContent element node with an attribute it is mapped to an object property instance of the ontology, the object property having a domain class instance and a range class instance, the domain class instance of the object property instance being the instance which is generated for the operation of the SOAP request, the range class instance of the object property instance being the class instance which is generated for the PSVI type annotation of the XML simpleContent element node;

b4) if the input or output message contains an XML complexContent element node it is mapped to an object property instance of the ontology, the object property having a domain class instance and a range class instance, the domain class instance of the object property instance being the instance which is generated for operation of the SOAP request, and the range class instance of the object property instance being the class instance which is generated for the PSVI type annotation of the XML complexContent element node.

9. The method according to claim 5, wherein an ontology definition for the ontology is established such that an object or datatype property of an ontology class can be marked as grounded.

10. A computer loadable data structure, that is adapted to perform the method according to the method claim 1 while the data structure is being executed on a computer.

11. Computer program, wherein the computer program is adapted to perform the method according to the method claim 1 while the computer program is being executed on a computer.

12. Computer program comprising program means for performing the method according to the method claim 1 while the computer program is being executed on a computer or on a computer network.

13. Computer program comprising program means to perform the method according to the method claim 1, wherein the program means are stored on a storage medium readable to a computer.

14. A storage medium, wherein a data structure is stored on the storage medium and wherein the data structure is adapted to perform the method according to the method claim 1 after having been loaded into a main and/or working memory of a computer or of a computer network.

15. Computer program product having program code means, wherein the program code means are stored on a storage medium, for performing the method of the method claim 1, if the program code means are executed on a computer or on a computer network.

* * * * *